(12) United States Patent
Dürr et al.

(10) Patent No.: US 12,341,821 B2
(45) Date of Patent: Jun. 24, 2025

(54) EXPERIENCE BASED DISPATCH OF REGULATED WORKLOADS IN A CLOUD ENVIRONMENT

(71) Applicant: International Business Machines Corporation, Armonk, NY (US)

(72) Inventors: Thomas Dürr, Magstadt (DE); Martin Smolny, Boeblingen (DE); Michael Beck, Bad Teinach-Zavelstein (DE); Daniel Pittner, Esslingen am Neckar (DE)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 17/946,097

(22) Filed: Sep. 16, 2022

(65) Prior Publication Data

US 2024/0098115 A1     Mar. 21, 2024

(51) Int. Cl.
*H04L 9/40*         (2022.01)
*G06Q 30/018*    (2023.01)

(52) U.S. Cl.
CPC ........... *H04L 63/20* (2013.01); *G06Q 30/018* (2013.01)

(58) Field of Classification Search
CPC ............................. H04L 63/20; G06Q 30/018
See application file for complete search history.

(56) References Cited

U.S. PATENT DOCUMENTS

| 9,052,939 | B2 | 6/2015 | Ferris |
| 9,178,805 | B2 | 11/2015 | Goel |
| 9,832,138 | B1 * | 11/2017 | Skalski ................. G06F 9/5083 |

(Continued)

FOREIGN PATENT DOCUMENTS

| CN | 103384989 A | 11/2013 |
| TW | 201411368 A | 3/2014 |
| TW | 201945996 A | 12/2019 |

OTHER PUBLICATIONS

Bargh, Mortaza S. et al., "Privacy Protection in Data Sharing: Towards Feedback Based Solutions", Proceedings of the 8th International Conference on Theory and Practice of Electronic Governance (ICEGOV'14), Oct. 27-30, 2014, 9 pages.

(Continued)

*Primary Examiner* — Rupal Dharia
*Assistant Examiner* — Devin E Almeida
(74) *Attorney, Agent, or Firm* — CANTOR COLBURN LLP; Anthony Mauricio Pallone

(57) ABSTRACT

Mechanisms are provided for dispatching requests to service instances based on data storage boundaries. A request specifying an identity is received and dispatched to a service instance of a data storage boundary, where each data storage boundary is defined by a regulation or policy restricting data storage of specific types of data to computing devices within a specified boundary. A feedback response, specifying a target location, is received from the service instance in response to determining that the service instance cannot access the data because the data is associated with a different data storage boundary. A dynamic dispatch rule specifying the identity and the target location is generated and a subsequent request specifying the identity is processed by executing this dynamic dispatch rule to dispatch the subsequent request directly to a service instance associated with the target location.

18 Claims, 7 Drawing Sheets

(56) References Cited

U.S. PATENT DOCUMENTS

| | | | |
|---|---|---|---|
| 10,616,281 B1* | 4/2020 | Chud | H04L 63/107 |
| 10,673,905 B1* | 6/2020 | Chud | H04L 63/20 |
| 10,673,962 B2* | 6/2020 | Mueller | H04L 67/562 |
| 11,228,650 B2 | 1/2022 | Blair | |
| 11,797,391 B2* | 10/2023 | Brunzema | G06F 11/1484 |
| 2005/0053046 A1 | 3/2005 | Wang | |
| 2005/0249199 A1 | 11/2005 | Albert et al. | |
| 2008/0060082 A1* | 3/2008 | Matthews | H04L 67/02 726/27 |
| 2012/0110044 A1 | 5/2012 | Nagpal et al. | |
| 2013/0311597 A1 | 11/2013 | Arrouye et al. | |
| 2016/0344543 A1* | 11/2016 | Alness | H04L 63/06 |
| 2016/0366246 A1* | 12/2016 | Battle | G06F 9/5055 |
| 2019/0289058 A1 | 9/2019 | Bhoj et al. | |
| 2020/0044862 A1* | 2/2020 | Yadlin | H04L 9/3247 |
| 2020/0159592 A1* | 5/2020 | Hansmann | G06F 9/4881 |
| 2020/0162239 A1* | 5/2020 | Carver | G06F 16/2365 |
| 2021/0157848 A1 | 5/2021 | Doshi et al. | |
| 2021/0240541 A1* | 8/2021 | Kuik | H04L 67/1001 |
| 2022/0012332 A1 | 1/2022 | Dürr et al. | |
| 2022/0159064 A1* | 5/2022 | Barton | H04L 45/126 |
| 2022/0368649 A1* | 11/2022 | Laplanche | G06F 9/5072 |
| 2024/0073177 A1* | 2/2024 | Nainar | H04L 61/2514 |

OTHER PUBLICATIONS

Goldsztajn, Diego et al., "Self-Learning Threshold-Based Load Balancing", Informs Journal on Computing, vol. 34, No. 1, Jan.-Feb. 2022, 17 pages.

Rahman, Mazedur et al., "Load Balancer as a Service in Cloud Computing", Proceedings of the 2014 IEEE 8th International Symposium on Service Oriented System Engineering (SOSE'14), Apr. 2014, 8 pages.

Zhu, Dapeng et al., "Feedback Based Routing", ACM SIGCOMM Computer Communications Review, vol. 33, Issue 1, Jan. 2003, 6 pages.

International Search Report and Written Opinion dated Oct. 9, 2023 for International Application No. PCT/EP2023/072242, 15 pages.

Office Action dated Jul. 12, 2024 received from the Intellectual Property Office (TIPO) for Application No. 112118015, 6 pages.

* cited by examiner

```
{
    "dispatch_target" : "https://eu.iam.cloud.ibm.com"
    "context" : [
            { "param_name" : "apikey", "param_value" : "ABCDEFG" },
            { "method" : "get" },
            { "contextPath" : "/identity/token" }
    ]
}
```

*FIG. 4*

```
<Rule>                                    500
        <condition method = "get" comparedBy="equals" />  — 510
        <condition contextPath = "/identity/token" comparedBy="equals" />  — 520    530
        <condition paramName="apikey" param_value="ABCDEFG" comparedBy="equals" />

<Action effect="dispatch" target="https://eu.iam.cloud.ibm.com" />  — 540

</Rule>
```

*FIG. 5*

EXPERIENCE BASED DISPATCH OF REGULATED WORKLOADS IN A CLOUD ENVIRONMENT

BACKGROUND

The present application relates generally to an improved data processing apparatus and method and more specifically to an improved computing tool and improved computing tool operations/functionality for automatically dispatching regulated and/or segmented workloads in a cloud computing environment based on previous experience and feedback.

With regard to data security the physical storage location of data is of concern as it may impact the accessibility of the data as well as who has access to that data. This concern may be one of geography where national regulations require that sensitive data, such as personally identifiable data for a nations' citizenry, be stored within geographical borders and corresponding data network borders, of the particular nation. This is increasingly a concern with cloud based computing environments and large scale datacenters that may span various geographical regions and many different nations as well as potentially different organizations. Being able to control who has access to data and how and when individuals have access to this data is of high importance, especially when the data is of a sensitive nature.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for dispatching requests to service instances based on data storage boundaries. The method comprises receiving a first request to access data associated with an identity specified in the first request and dispatching the first request to a first service instance associated with a first data storage boundary of a plurality of data storage boundaries. Each data storage boundary is defined by a regulation or policy restricting data storage of one or more specific types of data to computing devices within a specified physical, or network topological, region. The method further comprises receiving a feedback response from the first service instance in response to the first service instance determining that the first service instance does not have access to the data due to the data being of a type that is associated with a second data storage boundary different from the first data storage boundary. The feedback response specifies a target location associated with the second data storage boundary. In addition, the method comprises, in response to receiving the feedback response, automatically generating a dynamic dispatch rule specifying the identity and the target location and storing the dynamic dispatch rule in a dynamic dispatch rule database. Moreover, the method comprises processing a subsequent second request specifying the identity at least by performing a lookup operation in the dynamic dispatch rule database for a matching dynamic dispatch rule corresponding to the specified identity and executing the matching dynamic dispatch rule to dispatch the subsequent request directly to a second service instance associated with the target location. In this way, the mechanisms of the illustrative embodiments are able to automatically generate dynamic dispatch rules that take into account data storage boundaries and bypass much of the network traffic and processing costs associated with different service instances having to re-dispatch requests due to a lack of access to the data because of data storage boundary regulations/policies.

In some illustrative embodiments, dispatching the first request to a first service instance comprises performing a lookup in the dynamic dispatch rule database for the identity specified in the first request. In response to failing to find a matching entry in the dynamic dispatch rule database for the identity, executing a load balancing operation to dispatch the first request to a next available service instance as the first service instance. In this way, requests may be submitted quickly to the first available service instance and if that service instance cannot access the data due to data storage boundaries, the mechanisms of the illustrative embodiments are able to determine the target location and data storage boundary so as to dispatch the request to the appropriate service instance and generate a dynamic dispatch rule to handle such requests directed to the identity in the future.

In some illustrative embodiments, receiving the feedback response from the first service instance comprises requesting, by the first service instance, data corresponding to the identity in the request from a backend service instance database, and, in response to not finding the data corresponding to the identity in the backend service instance database, sending, by the first service instance, a target location request that requests the target location of the data to a global account management service. In addition, such illustrative embodiments further comprise receiving, by the first service instance, the target location of the data from the global account management service, and sending, by a feedback agent of the first service instance, the feedback response specifying the target location to the data processing system. In this way, the feedback agent is able to obtain the actual target location of the data requested from the global account management service and provide feedback specifying this target location for use in automatically generating dynamic dispatch rules for execution when processing subsequent requests directed to the specified identity.

In some illustrative embodiments, the feedback response is sent asynchronously, with respect to processing the first request, by the feedback agent to the data processing system, and wherein automatically generating a dynamic dispatch rule is performed asynchronously with respect to processing the first request. In this way, the feedback mechanism and the generation of the dynamic dispatch rule may be performed at substantially a same time, or at a different timing, or in a parallel path of execution, with the processing of the first request. That is, the feedback and dynamic dispatch rule generation is not dependent upon the completion of the processing of the first request.

In some illustrative embodiments, the method further comprises dispatching, by the first service instance to the second service instance, the first request, and receiving, by the first service instance, from the second service instance, the data for which access is requested in the first request. In these illustrative embodiments, the method also comprises generating a response to the first request based on the received data, and sending the response to a requesting computing device that sent the first request. In this way, the first service instance is able to obtain the requested data response from the second service request and provide it back to the requesting computing device to thereby complete the processing of the first request.

In some illustrative embodiments, processing the subsequent second request comprises performing a lookup in the dynamic dispatch rule database for the identity specified in the second request, and, in response to finding a matching dynamic dispatch rule in the dynamic dispatch rule database for the identity, executing the matching dynamic dispatch rule to set a data storage boundary, in the plurality of data storage boundaries, that corresponds to the identity, to be a second data storage boundary. Moreover, in these illustrative embodiments, the method also comprises transmitting the second request to the second service instance, where the second service instance is associated with the second data storage boundary. In addition, in these illustrative embodiments, the method comprises receiving data requested by the second request based on a processing of the second request at the second service instance to obtain the data requested by the second request from the target location, and transmitting a response, based on the received data from the target location, to a requesting computing device that sent the second request. In this way, by executing the matching dynamic dispatch rule from the database, the computation costs and network traffic costs for determining a target location and data storage boundary and its corresponding service instance are avoided, as well as such costs associated with re-dispatching requests between service instances when the receiving service instance does not have access to the requested data due to such data storage boundaries.

In some illustrative embodiments, the plurality of data storage boundaries are at least one of geographical, geopolitical, or organizational data storage boundaries that specify data associated with a geographical entity, geopolitical entity, or organization entity cannot be stored outside a corresponding data storage boundary. Any data storage boundaries may be utilized, but geographical, geopolitical, or organizational data storage boundaries are utilized to protect personally identifiable information for individuals associated with the corresponding geographical, geopolitical, or organizational entities. Thus, the illustrative embodiments operate to satisfy the requirements of data storage boundaries with regard to such entities.

In some illustrative embodiments, the identity specified in the first request is an APIKey corresponding to the data for which access is requested by the first request, and the data comprises personally identifiable data of one or more accounts in a cloud computing environment, where the personally identifiable data of the one or more accounts is restricted to storage within corresponding data storage boundaries in the plurality of data storage boundaries. In some illustrative embodiments, the data processing system is a global gateway computing system, of a cloud computing environment, operating in conjunction with a plurality of different service instances across a plurality of data storage boundaries. In some illustrative embodiments, the plurality of different service instances are regional identity and access management (IAM) cloud service instances. Again, this permits the protection of personally identifiable data in accordance with specified regulations/policies, based on data storage boundaries, across a plurality of data storage boundaries that are part of a cloud computing environment, and in which regional IAM cloud service instances operate in each of the different data storage boundaries.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is an example diagram of feedback provided by a target service in response to the target service not having access to the requested data in accordance with on illustrative embodiment;

FIG. 5 is an example diagram of a dispatch rule that is automatically and dynamically generated based on feedback received from a target service in accordance within one illustrative embodiment;

DETAILED DESCRIPTION

Figure 1:
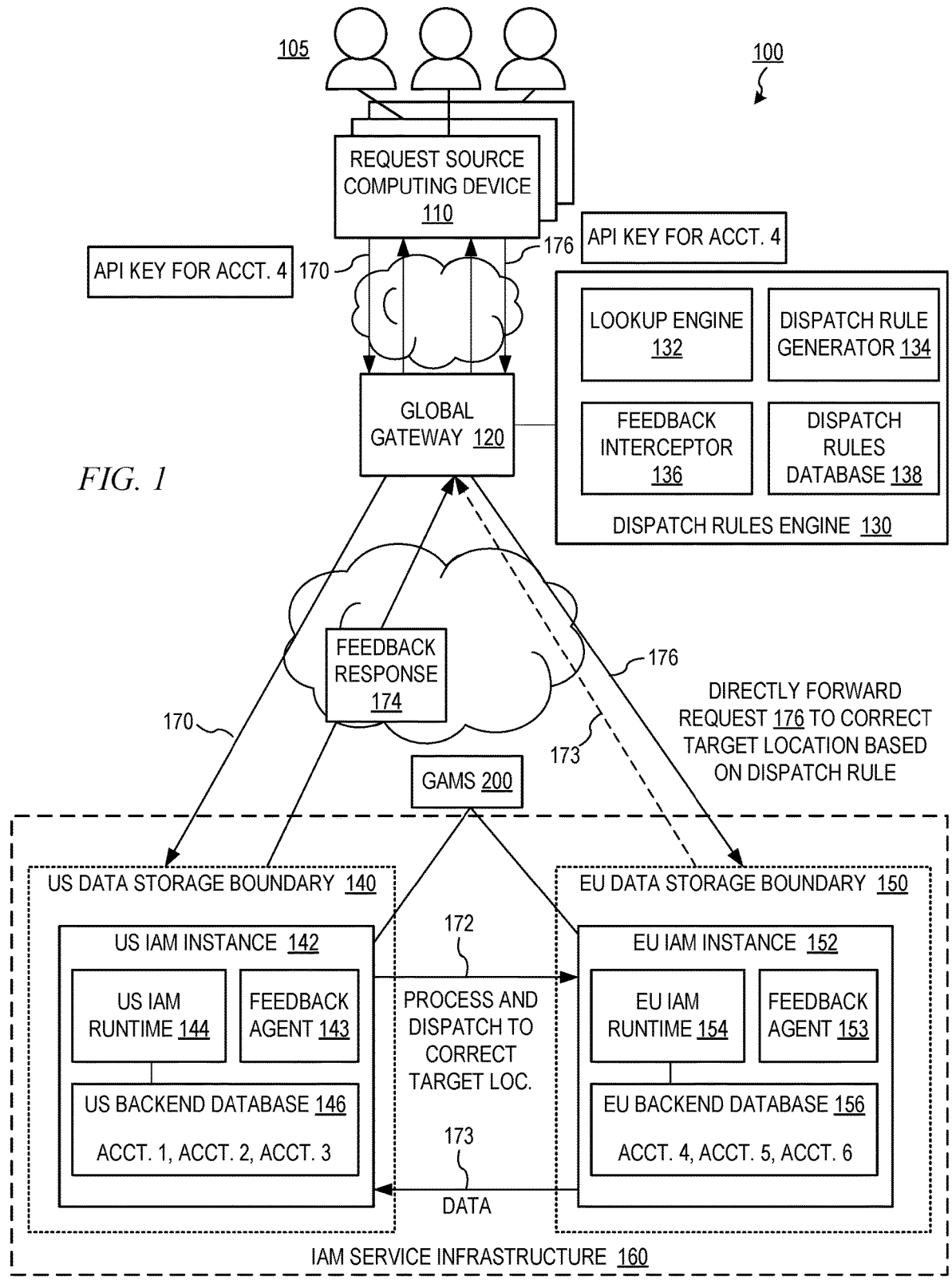
FIG. 1 is an example diagram illustrating an operation of a global gateway with target services under a regulated and segmented workload restriction in accordance with one illustrative embodiment.

As noted above, data security is a critical concern in computing environments, and especially with regard to personally identifiable (PI) data for a particular population, e.g., citizenry of a nation, particular employees of a government institution, members of certain groups, organizations, and the like. This is especially a concern in cloud computing environments where the environment itself spans multiple geographic regions and involves many different parties which may be subject to different regulations or no regulations depending on their physical locations. To address this openness and widespread nature of cloud computing environments, in many cases, governmental regulations have been instituted that require limitations on the storage and management of data in these cloud computing environments. For example, these limitations may require that PI data storage and management be limited to specific physical or virtual locations only, where these physical/virtual locations are defined in terms of geographical, geopolitical, or organizational regions defined by regulations or policies, with locations that are part of the same geographical, geopolitical, or organization region being referred to herein as "boundaries". It should be appreciated that such boundaries may be associated with corresponding geographical, geopolitical, or organizational entities, such as countries, nations, business enterprises, or the like.

For example, in 2011, the United States of America Federal Government established the Federal Risk and Authorization Management Program (FedRAMP) which seeks to provide a cost-effective, risk-based approach for the adoption and use of cloud services by the federal government of the United States. As part of the FedRAMP regulations, the "boundaries" are United States datacenters, meaning that PI data related to FedRAMP compliant cloud accounts needs to be stored and managed in United States datacenters only. Moreover, requests need to be routed by the global gateway, since the boundary where the requested data resides may not be known by the caller. The global gateway is a component to allow data to flow from the internet to the service infrastructure and back. Based on the source of the client, the global gateway uses the quickest network paths between the client and the service infrastructure. An example of such a global gateway may be the identity and access management (IAM) global gateway computing system available from International Business Machines (IBM) Corporation of Armonk, New York.

Thus, requests for accessing data, such as account data, are routed through the global gateway, but these requests may or may not specify a location of where that requested data is stored. That is, the requestor computing device, application executing on the requestor computing device, or the like, may send requests that include an account identifier (ID) that may be used to associate the account ID with a location in a straight-forward manner. However, in other cases, the requests may not specify the account relation and thus, will require expensive calculations to determine where the requested data is stored, where "expense" is a performance measure that is measured in terms of time to process the request, amount of processing cycles required, or other computer performance measure.

The global gateway is a service that is provided by a different team or even company than the target services themselves. From a separation of concerns, it is not a good idea to build in knowledge about the backend service into the global gateway. In addition, it can be dangerous to give the global gateway access to the backend data, as a security exposure on the global gateway would immediately threaten the backend data, while if the global gateway is only providing access to the service, there is another layer of security to protect the backend data. Thus, the global gateway does not have access to the backend data and only the target service of the request can determine the location of the requested data. Hence, the determination of the location of the requested data cannot be performed by the global gateway for all requests and, as a result, requests are sent from the global gateway to the target service, which may often result in requests having to be rerouted back through the global gateway to the determined location of the requested data.

As an example, consider an application programming interface (API) key (APIKey) is a unique piece of code that is sent from one application to another on a data network, which ensures that an interface is only being used in the way it was intended. APIKeys are an authentication mechanism which prevents unauthorized programs from accessing a function or resource on a target computing system. An APIKey may be used to obtain an identity token, e.g., a JavaScript Object Notation (JSON) Web Token (JWT), or other proof of identity for an identity in a particular cloud computing environment account. This APIKey value used for this exchange does not give any indication where the actual APIKey (document) is stored, as embedding region or account information into the APIKey itself would prevent moving it to a different location. Thus, a costly calculation is required to determine the APIKey and corresponding account data location, where this calculation may involve (1) authorization/authentication checks for authorization headers, including outbound calls to get, for example, client identifiers; (2) parameter validation; (3) cryptographic operations on the APIKey; (4) outbound calls to the database of the current location to determine existence of the APIKey; and (5) redirects to other regions when the APIKey is not present on the current location. These operations represent a significant performance overhead, or cost.

These operations would need to be performed with each request for access to account data where the account information is not specified in the request, which is often the case, e.g., with systems using APIKeys and the like, as the location of the account data cannot be identified at the global gateway. That is, the request needs to be forwarded from the global gateway to the target service which performs the costly calculations and processing to locate the account data, and then must reroute or redirect the request to the actual location of the account data and corresponding target service, often requiring a flow back through the global gateway to this location. This creates considerable overhead with request processing and inefficiencies in performance. This overhead and performance inefficiencies are significant when one recognizes that many cloud computing systems and services process millions of calls (requests for access) for account data each hour. This results in increased requirements processing power, resource allocation, network traffic, and slower response times for users.

The illustrative embodiments provide an improved data processing apparatus and method, and more specifically an improved computing tool and improved computing tool operations/functionality for automatically dispatching regulated and/or segmented workloads in a cloud computing environment based on previous experience and feedback. With the improved computing tool and improved computing tool operations/functionality of the illustrative embodiments, in a cloud computing system, the global gateway service computing system(s) automatically and dynamically generates and applies dispatch rules based on automatically generated feedback from target services. The automatically generated feedback from the target services comprises feedback data specifying the location of account data for satisfying a received request when the received request requires a redirect of the request to a different location or target service. The feedback data is generated as a result of the target services performing the computations to determine the location of the requested account data. Thus, when a dispatch rule is not present, the target service performs the increased cost processing of the request to determine the location of the account data and provides that location information in the feedback from the target service.

The feedback data, specifying the location of the account data for satisfying the request, is provided to the global gateway service which automatically and dynamically generates dispatch rules correlating the identity specified in the request with the location of the account data, e.g., APIKey to account data location mapping. Once the dispatch rules have been automatically and dynamically generated, future requests for accessing data associated with the same identity, e.g., APIKey, are automatically dispatched to the correlated location in the dispatch rule corresponding to the identity without having to forward the request to the target service to determine the location of the requested data. In this way, the high overhead or costly processing of the request to identify the location of the requested data may be avoided, thereby reducing processing power, resource allocation, and network traffic requirements, as well as improving response times for users by providing quicker response times.

If the location of the requested details change, then this change will be automatically detected and the dispatch rules automatically and dynamically updated to dispatch requests directly to the current location of the requested data. For example, if a dispatch rule specifies location A for the requested data, and the requested data has been moved to location B, when the request is dispatched to the target service associated with location A, the target service will again determine that it does not have access to the requested data, will perform the computations to determine the location of the requested data, and return the feedback to the global gateway which will then generate/update the dispatch rule to specify the new location B.

Thus, for a request for a specified identity, e.g., APIKey, for which there are no dispatch rules, or for which the location of the requested data, e.g., account data, corresponding to the identity (e.g., APIKey) has been moved, the computations and processing needed to locate the requested data are performed and feedback data is provided back to the global gateway for automatic and dynamic generation/update of dispatch rules. For subsequent requests directed to this same identity, when the location of the requested data has not been changed, the requests can be dispatched directly to the target service associated with the location of the requested data without having to perform the computations and processing to determine the location.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As described above, the illustrative embodiments of the present invention are specifically directed to an improved computing tool that automatically and dynamically generates dispatch rules for execution in a global gateway for controlling access to requested data in accordance with established boundaries for workloads, such as those dictated by governmental or organizational regulations, for example. All of the functions of the illustrative embodiments as described herein are intended to be performed using automated processes without human intervention. Thus, the illustrative embodiments are not organizing any human activity and are not practically able to be performed in the human mind, but are in fact directed to the automated logic and functionality of an improved computing tool.

FIG. 1 is an example diagram illustrating an operation of a global gateway with target services under a regulated and segmented workload restriction in accordance with one illustrative embodiment. It should be appreciated that while FIG. 1 will assume an APIKey based request for accessing account data for a user of a request source computing device 110, the illustrative embodiments are not limited to such. To the contrary, the illustrative embodiments may be applied to any computer architecture in which a request for access to sensitive or confidential data is received, and for which government or organizational regulations require boundary based access and management controls for the requested data, e.g., in the case of government geographic regulations, such as FedRAMP, such data is required to be stored within a specific geographic boundary of the United States of America and its territories. Moreover, the illustrative embodiments are applicable to any kind of data that cannot be mapped automatically into a regulated and segmented region and instead must utilize the target service to determine the segmented region.

As shown in FIG. 1, in a distributed data processing system environment 100, there is provided one or more end user computing devices 110, also referred to as request source computing devices 110 as they submit requests for accessing data, which may include sensitive data. While FIG. 1 only shows a single end user computing device 110 associated with an end user 105 for ease of depiction and description herein, it should be appreciated that an actual distributed data processing system environment 100 may include many hundreds, thousands, or more end users and corresponding end user computing devices submitting requests and receiving access to secure data via the mechanisms of the illustrative embodiments.

In addition to the end user computing devices 110, the distributed data processing system environment provides a global gateway 120 which is augmented in accordance with the illustrative embodiments to include one or more instances of a dynamic dispatch engine 130 executing within the global gateway 120. The global gateway 120 is a load distribution computer infrastructure having a one or more computing devices, e.g., servers, executing load balancing algorithms and other services. In general, the global gateway 120, without the augmentation to include the dynamic dispatch engine 130 of the illustrative embodiments, routes requests to backend services based solely on load balancing considerations. The global gateway 120 cannot, without the augmentation of the illustrative embodiments, perform content-knowledge based requirements based dispatching of requests to appropriate backend services.

The global gateway 120 is the infrastructure component in front of (relative to the end user computing devices 110) the Identity and Access Management (IAM) service 160, which is comprised of a plurality of standalone computing devices, which may be physical computing devices and/or virtual machines, across a plurality of different boundaries 140-150. In the depicted example, the boundaries 140-150 are shown to be different geographies, but can also be organizational boundaries, governmental boundaries, network topology boundaries, or the like, that are not necessarily tied to geography. The global gateway 120 performs the determinations, based on load and origination of the requests from the end user computing devices 110, as to which of the physical/virtual machines (hereafter collectively referred to as "machines") the request is routed to.

The IAM service system 160 provides a centralized identity and access management framework for accessing organization data. In the depicted example, the IAM service 160 is comprised of a plurality of machines in a plurality of geographic boundaries 140-150, e.g., a United States (US) IAM instance 140 and a European Union (EU) IAM instance 150, where each geographic boundary 140-150 provides one or more corresponding IAM service instances 142, 152. Each IAM service instance 142, 152 comprises a corresponding IAM runtime 144, 154 and backend IAM database (DB) 146, 156. The IAM runtime 144, 154 executes the applications to perform operations for processing requests and accessing data stored in the corresponding backend IAM databases 146, 156, along with other operations. For example, the IAM databases 146, 156 may store account data for a plurality of user accounts, e.g., accounts 1-6 in the depicted example, with the corresponding IAM runtimes 144, 154 providing the data interfaces and applications for accessing this account data in the backend IAM databases 146, 156.

In accordance with the illustrative embodiments, the global gateway 120 is augmented with a dynamic dispatch engine 130 that provides an improved computing tool and improved computing tool operations/functionality for automatically and dynamically learning the physical storage locations, with regard to physical storage boundaries 140-150, of requested data and generating dispatch rules to direct requests to these learned physical storage locations directly without having to perform IAM service computing system computations to locate the physical location of the data across the various boundaries 140-150. The dynamic dispatch engine 130 comprises a dispatch rule lookup engine 132, a dispatch rule generator 134, a feedback interceptor 136, and a dynamic dispatch rules storage 138. Additional components (not shown) of the dynamic dispatch engine 130 may also be provided for performing supportive functionality, such as application programming interfaces, libraries, control logic, and the like, that facilitates the operations and functions of the elements 132-138.

The dispatch rule lookup engine 132 provides computer executed logic to perform operations/functionality for automatically performing a lookup of dispatch rules stored in the dynamic dispatch rules storage 138 in response to receiving request from a request source computing device (e.g., end user computing device 110) having an identity specified in the request. The identity may be specified in any suitable manner for the specific implementation, but for purposes of the depicted example, the identity is specified as an APIKey in the received request. The dispatch rule lookup engine 132 performs a lookup operation to determine if there is an existing dispatch rule associated with the specified identity in the dynamic dispatch rules storage 138.

The dispatch rules stored in the dynamic dispatch rules storage 138 associate a dispatch location with a corresponding identity. Thus, if the lookup operation performed by the dispatch rule lookup engine 132 results in a matching dispatch rule in the dynamic dispatch rules storage 138, then the matching dispatch rule is executed to direct the request to the corresponding dispatch location directly, rather than the location that would be determined through load balancing. If a matching dispatch rule is not found through the lookup operation, then the global gateway 120 performs dispatch of the request based on its normal load balancing determinations, which may result in the request being sent to a location, i.e., IAM instance, that is not permitted to access the requested data due to the boundary constraints for the storage and management of access to sensitive data. Thus, contrary to the normal load balancing operations of the global gateway 120 that does not look at the content of the request to direct dispatch of the request to an IAM service instance 142, 152, the dynamic dispatch rule engine 130 provides additional operations and functionality for intelligently dispatching requests based on the identity specified within the request itself and the data boundary constraints imposed by governmental and/or organizational regulations or policies.

In addition to the dispatch rule lookup engine 132 and dynamic dispatch rules storage 138, the dynamic dispatch engine 130 further comprises a dispatch rule generator 134 and a feedback interceptor 136. When a request specifies an identity that does not have a corresponding dispatch rule in the dynamic dispatch rules storage 138, the request is dispatched to an IAM service instance based on load balancing and/or other considerations that do not take into consideration the physical storage location requirements of governmental/organizational regulations and/or policies. The location, or IAM service instance, to which the request is dispatched performs the operations previously described above to compute the actual location of the requested data and forward the request to the IAM service instance and/or computing devices that can access that requested data.

In accordance with the illustrative embodiments, the IAM service instances 142, 152 are further augmented to include feedback agents 143, 153 that operate to provide feedback responses to the global gateway 120 that specify the actual determined target location of the requested data in the case that the IAM service instance 142, 152 does not have access to the requested data, i.e., is not associated with the actual target location of the requested data. The feedback interceptor 136 intercepts these feedback responses from the feedback agents 143, 153 of the IAM instances 142, 152 and provides the feedback information to the dispatch rule generator 134. This feedback information may include the current actual location of the requested data and the specified identity in the request. In some illustrative embodiments, the feedback information may further specify whether or not the request was dispatched based on a matching existing dispatch rule in the dynamic dispatch rules storage 138. The dispatch rule generator uses the feedback information to automatically and dynamically generate a new dispatch rule associated with the specified identity in the dynamic dispatch rules storage 138. As a result, when a next request is received from any request source computing device 110, which does not have to be the same computing device 110 as the previous request, the stored dynamic dispatch rule will be found as a match during the lookup operation and the subsequent request will be directly dispatched to the actual location, i.e., IAM instance, which has accessibility to the requested data.

It should be appreciated that there are some instances where a matching dynamic dispatch rule may be present in the dynamic dispatch rules storage 138, but the requested data, e.g., account data, may have moved locations, e.g., from the EU IAM instance 152 backend database 156 to the US IAM instance database 146. In such cases, the lookup operation performed by the lookup engine 132 will find the matching dynamic dispatch rule and execute the matching dispatch rule to dispatch the request to the IAM instance specified in the dispatch rule. However, the IAM instance will determine that it does not have accessibility to the requested data and will perform the computations to determine the actual current location of the requested data. In such a case, the IAM instance will again send the feedback response to the global gateway 120 which will be intercepted by the feedback interceptor 136 which will provide the feedback to the dispatch rule generator 134. The dispatch rule generator 134, before generating a new dynamic dispatch rule, may again invoke the lookup engine 132 to determine if there is already an existing matching dispatch rule for the identity and if so, update the existing matching dispatch rule to reference the current actual location that has accessibility to the requested data. Alternatively, as noted above, the feedback information may include a dispatch identifier field that is set to specify that the request was originally dispatched based on a matching dynamic dispatch rule that exists in the dynamic dispatch rules storage 138 and thus, the feedback information may be used by the dispatch rule generator 134 to update the matching existing dynamic dispatch rule in the storage 138.

In operation, as shown in FIG. 1, a request source computing device 110 submits a request 170 to access account data (for account 4 in the depicted example) by specifying in the request the APIKey for the account whose data is requested. The request may be generated in response to user input to a graphical user interface or any other user interface of an application executing on the request source computing device 110, an automatically generated request by an application executing on the request source computing device 110, or the like. For example, a client 110 may call an IBM Cloud Service, such as a Cloudant database, an IBM Watson service, or the like. Before being able to call the IBM Cloud Service, the client 110 may need to get an "IAM Token" which is a short-living data set to provide the client identity. To get the "IAM Token", the client 110 executes a call to the IAM service to exchange the APIKey into an "IAM Token". This is just one example, and the illustrative embodiments are not limited to APIKeys or "IAM Tokens" but can be used with any identifiers of identity and/or accounts or data sets without departing from the spirit and scope of the present invention. The request 170 is routed through the local area network (not shown), wide area network (not shown), and/or other wired/wireless data communication connections to a global gateway 120. The global gateway 120, in accordance with the illustrative embodiments, has been augmented to provide a dynamic dispatch rule engine 130.

In response to receiving the request specifying the identity associated with the requested data, e.g., the APIKey, the lookup engine 132 performs a lookup of the identity (APIKey) in the dynamic dispatch rules database 138. Assuming that there is no existing dynamic dispatch rule for the identity (APIKey) in the database 138, the global gateway 130 performs its normal load balancing based routing of the request to an IAM instance 142, 152 regardless of the data storage boundaries 140, 150. Thus, in the depicted example, the request may be routed to the US IAM instance 142 in geographic boundary 140, e.g., the geographical locations associated with the United States of America and its territories, even though the data for account 4 associated with the APIKey is actually stored in the backend database 156 associated with the EU IAM instance 152 in geographic boundary 150 and the US IAM instance 142 cannot access the data for account 4.

As a result, the US IAM instance 142 performs the costly computations for determining the target location of the requested data associated with the identity (APIKey) and determines that the target location is the EU IAM instance backend database 156 to which it does not have access. Thus, the US IAM instance 142 processes the request and dispatches 172 the request to the EU IAM instance 152 associated with the correct target location in database 156.

The EU IAM instance 152 processes the request, retrieves the requested data, and provides the requested data 173 to the global gateway 120 via the US IAM instance 142, which only temporarily and non-persistently stores the data in accordance with governmental and/or organizational regulations. If government and/or organizational regulations do not permit temporary non-persistent storage of data outside the regional boundary 150, then the EU IAM instance 152 may instead send the data 173 directly back to the global gateway 120 bypassing the US IAM instance 142, in some illustrative embodiments.

In addition, in response to the US IAM instance 142 determining that it is not associated with the target location of the requested data, i.e., does not have access to the requested data as it is not stored in the backed database 146 of the US IAM instance 142, the feedback agent 143 is instructed by the US IAM instance runtime environment 144 to send a feedback response 174 to the global gateway 120 specifying the feedback information including the determined target location and the identity specified in the original request 170, e.g., the APIKey. In some cases, this feedback information may include a dispatch rule identifier that is set to a first value to indicate whether this feedback is due to a matching dynamic dispatch rule having been found for the APIKey when the original request was dispatched from the global gateway 120, or is set to a second value if a matching dynamic dispatch rule was not found for the APIKey. Whether or not the dispatch of the original request was due to a matching dynamic dispatch rule or not may be specified in the dispatching of the original request 170 to the IAM instance from the global gateway 120. This indicator is not required, but may be provided in some illustrative embodiments, to facilitate a determination of whether to create a new dynamic dispatch rule or to update an existing dynamic dispatch rule in the dynamic dispatch rules database 138 based on the feedback information.

In the depicted example, in response to the feedback response 174 being received by the global gateway 120, the feedback interceptor 136 of the dispatch rule engine 130 intercepts the feedback response 174 and provides the feedback information to the dispatch rule generator 134 which generates/updates a dynamic dispatch rule for the specified identity (APIKey) and target location in the dynamic dispatch rules database 138. Thereafter, when a subsequent request 176 with the same identity is received, either from the same request source computing device 110 or another request source computing device, the lookup engine 132 will perform the lookup operation in the dynamic dispatch rules database 138 and will find a matching dynamic rule based on the identity (APIKey). As a result, the global gateway 120 will execute the matching dynamic dispatch rule and dispatch the request 176 directly to the IAM instance, e.g., EU IAM instance 152, associated with the target location, e.g., the backend database 156 associated with the EU IAM instance 152. This avoids having to perform the computations and network traffic when the subsequent results 176 are sent to the incorrect IAM instance, e.g., US IAM instance, due to load balancing based routing.

It should be appreciated that the depiction in FIG. 1 is only an example architecture and is not intended to state or imply any limitations as to the architectures in which the aspects of the illustrative embodiments may be implemented. While the depicted example uses the IBM IAM service and global gateway as examples, the illustrative embodiments are not limited to such. To the contrary, the dynamic dispatch engine 130 may instead be provided in any architecture in which there is a requirement for control of physical storage locations for storing sensitive data and for dispatching/controlling access to such sensitive data, taking into account physical storage boundary requirements.

FIG. 1 provides an overview of the operation of the primary operational entities of an architecture in accordance with one or more illustrative embodiments. This architecture may be a cloud computing system architecture in which the IAM instances provide cloud computing services for performing identity and data access management. This management may include a global account management service that determines the target location of the requested data, whether that requested data is associated with the IAM instance that received the request or is associated with a different IAM instance. The process for performing the dispatching and forwarding of requests from the global gateway and/or from one IAM instance to another, involves a plurality of interactions between the primary operational entities which will now be detailed in the following data flow diagrams. The data flow diagrams shown in FIGS. 2-3 will assume a Representational State Transfer (REST) API and IAM service based example illustrative embodiments, but it should be appreciated that the present invention is not limited to such and other implementations may use other APIs and services. Thus, FIGS. 2-3 will make reference to REST API operations, such as POST, GET, and the like, for convenience of the present description but without intending to state or imply any limitation on the architecture or APIs that may be used in combination with the mechanisms of the illustrative embodiments.

Figure 2:
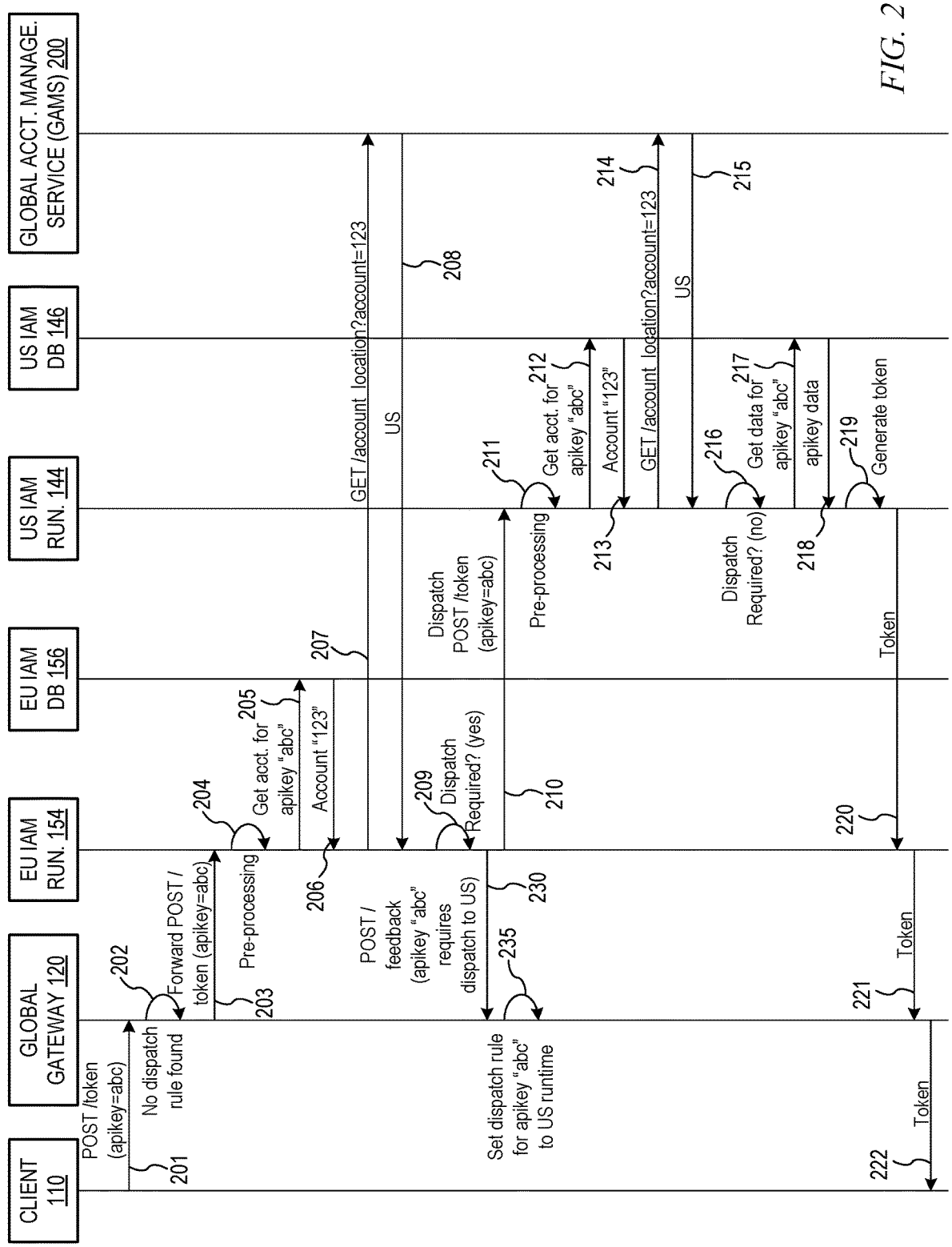
FIG. 2 is an example diagram of a data flow between entities of a cloud computing system for automatically and dynamically generating dispatch rules in a global gateway in accordance with one illustrative embodiment.

FIG. 2 provides an example diagram of the data flows between entities of a cloud computing system for automatically and dynamically generating dispatch rules in a global gateway in accordance with one illustrative embodiment. Similar reference numerals in FIG. 2, and other figures, are intended to reference similar entities as described previously with regard to FIG. 1.

Figure 3:
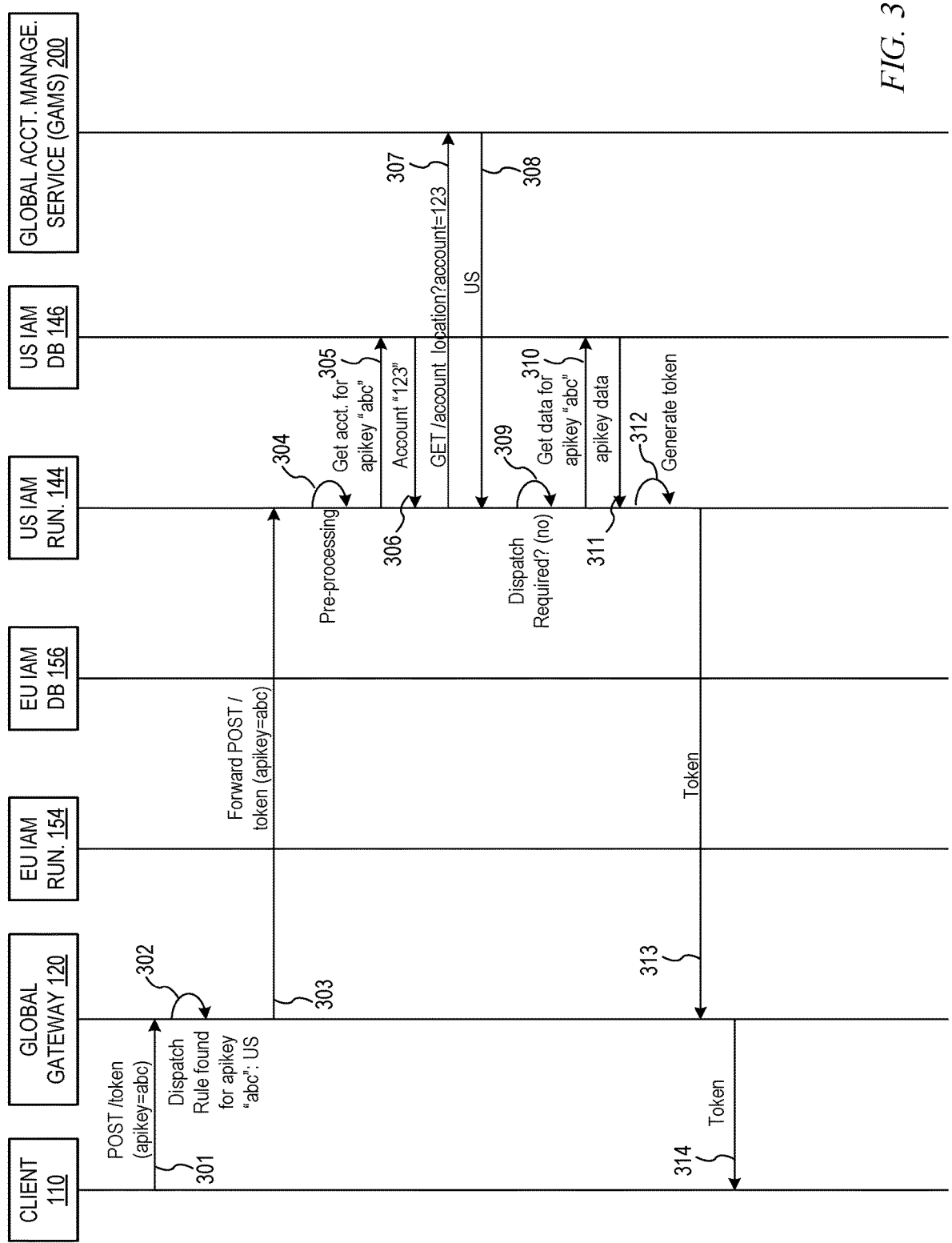
FIG. 3 is an example diagram of a data flow between entities of a cloud computing system for a request for which a dispatch rule exists for the specified identity in accordance with one illustrative embodiment.

As shown in FIG. 2, the operation starts with the request source computing device 110, referred to in FIGS. 2-3 as the "client" computing device 110, wanting to obtain a token for an existing APIKey, i.e., apikey="abc", however the client is not aware of which data storage boundaries the API keys are associated with, i.e., where the requested data is physically stored with regard to the data storage boundaries 140, 150. As a result, the client 110 calls the global gateway 120 by performing a POST/token (apikey=abc) call 201.

In response to the call from the client 110, the dispatch rules engine 130 of the global gateway 120 performs a lookup of dynamic dispatch rules in the dynamic dispatch rules database 138, via the lookup engine 132, and in this example, does not find a matching dynamic dispatch rule. That is, the global gateway 120 checks if a dispatch rule for the API key exists and, at this moment in the example data flow, this is the first call to the global gateway 120 for the given APIKey, so no dynamic dispatch rule currently exists. Hence, the dispatch rule engine 130 returns a result 202 that no dispatch rule is found.

In response to result 202 indicating that no dispatch rule was found, the global gateway 120 forwards the original call 201 to the next available IAM runtime cluster based on a load balancing algorithm, which in the depicted example turns out to be the IAM runtime in the EU geographic boundary 150, i.e., the EU IAM runtime 154. Hence, the global gateway 120 forwards the POST/token (apikey=abc) call 201 to the EU IAM runtime 154 via the forwarding call 203. In response to receiving the forwarding call 203, the EU IAM runtime 154 may perform pre-processing 204 of the APIKey to determine if the APIKey is valid, as well as perform other operations to prepare for processing the request (call) and accessing the requested data.

The EU IAM runtime 154 determines if the requested data associated with the APIKey are stored in the EU, US, or other data storage boundary, such as defined by governmental and/or organizational regulations and/or policies. Thus, the EU IAM runtime 154 checks inside the APIKey record, to determine which account this APIKey belongs to by performing a call 205 to the EU IAM database 156 to get the account information for the APIKey "abc" and determines that this APIKey corresponds to account "123" in the depicted example. The EU IAM runtime 154 then asks the global account management service 200, which may be provided as part of the IAM service 160 architecture or as a separate component from the IAM service 160 architecture, where the requested data for account "123" is physically stored by calling the global account management service 200 with a GET/account_location?account=123 call 207. The global account management service 200 returns a response 208 specifying the target location for the requested data for account "123", which in this example, is the US boundary. It should be noted that the global account management service (GAMS) 200 may be used by each of the IAM service infrastructure 160 instances 142, 152 across the various boundaries 140, 150 as it does not store any personally identifiable (PI) related data, but provides information about where account data is physically located, i.e., in which boundaries 140, 150 the account data may be found.

In response to the response 208 from the global account management service 200, the EU IAM runtime 154 determines 209 whether a dispatch of the original request, i.e., call 201, is needed. In this example, the IAM runtime in the EU, i.e., EU IAM runtime 154, does not have access to the IAM database in the US boundary, i.e., US IAM database 146, and thus, determines that a dispatch of the call 201 to the US IAM runtime 144 is required.

The EU IAM runtime 154 asynchronously sends a notification 230 to the global gateway 120 specifying the target location of the requested data for account "123" associated with the APIKey in the original call 201 by performing a POST/feedback (apikey "abc" requires dispatch to US) 230. This feedback will cause a dispatch rule to be automatically and dynamically generated and stored in the dynamic dispatch rules database 138 so that subsequent calls for the same APIKey can be directly routed to the US boundary, i.e., US IAM runtime 144. The dynamic dispatch rule is added to the database 138 via the "set dispatch rule" operation 235 which will allow skipping of operations 203-209 for subsequent calls with the same APIKey.

In response to the determination that the request (call 201) needs to be dispatched in operation 209, the EU IAM runtime 154 dispatches the request to the US IAM runtime 144 by performing a POST/token (apikey=abc) call 210. The US IAM runtime 144 performs operations 211-216 which are similar to the operations 204-209 performed by the EU IAM runtime 154. However, in the determination performed in operation 216 (similar to operation 209), the results of the determination are that a dispatch of the request is not required as the US IAM runtime 144 has access to the account detail data for account "123" corresponding to APIKey "abc" in the US IAM database 146. Therefore, the US IAM runtime 144 decides to continue generating the token (requested data) on the local cluster.

As a result, the US IAM runtime 144 retrieves, from the US IAM database 146, the account detail data for the APIKey by performing a "get details for apikey" operation 217. The US IAM database 146 returns 218, to the US IAM runtime 144, the account detail data for account "123" corresponding to the APIKey "abc". The US IAM runtime 144 generates 219 the token for the APIKey and returns 220 the token to the caller, e.g., EU IAM runtime 154 in this example. The EU IAM runtime 154 passes 221 the token to its caller, i.e., the global gateway 120, which sends the token to the original caller via the operation 222.

FIG. 3 is an example diagram of a data flow between entities of a cloud computing system for a request for which a dispatch rule exists for the specified identity in accordance with one illustrative embodiment. The operations shown in FIG. 3 are similar to those in FIG. 2 with the exception that in this case, the dynamic dispatch rules database 138 has an existing dynamic dispatch rule matching the identity (APIKey) in the call 301, resulting in an ability to skip the computations for determining a target location of the corresponding account for the specified identity.

Thus, as shown in FIG. 3, the operation starts with the client computing device 110 wanting to obtain a token for the same existing APIKey, i.e., apikey="abc", that was specified in the request from client 110 in FIG. 2. Again, the client is not aware of which data storage boundaries the API keys are associated with, i.e., where the requested data is physically stored with regard to the data storage boundaries 140, 150. As a result, the client 110 calls the global gateway 120 by performing a POST/token (apikey=abc) call 301.

In response to the call from the client 110, the dispatch rules engine 130 of the global gateway 120 performs a lookup of dynamic dispatch rules in the dynamic dispatch rules database 138, via the lookup engine 132, and in this case, due to the previous request processing shown in FIG. 2, a matching dynamic dispatch rule is found 302. The global gateway 120 executes the matching dynamic dispatch rule found in the database 138 and, as a result, forwards 303 the call 301 to the US IAM runtime 144 which is known to be associated with the US IAM database 146 where the account detail data is present, i.e., the target location specified in the dynamic dispatch rule. The US IAM runtime 144 may perform similar pre-processing 304 as described previously with regard to FIG. 2, and perform other similar operations 305-312 for obtaining the account associated with the APIKey, obtaining the account detail data from the US IAM database 146, and generating the corresponding token.

It should be noted that in some illustrative embodiments, the global gateway 120 uses a dynamic dispatch rule mechanism that specifies that the APIKey "abc" is connected to account "123" which is bound to the US region, but this information is not passed to the US IAM runtime 144. Therefore, the US IAM runtime 144 performs the operations 304-312 to validate the location of the account again. However, in other illustrative embodiments, some of these account location validation operations, such as operations 307 and 308, may be avoided since the global gateway 120 has an existing dispatch rule specifying the US region and thus, a validation via the GAMS 200 is not necessary. This information may be provided by the global gateway 120 to the US IAM runtime 144 so that the operations 307, 308 may be removed from the depicted flow. Both possibilities are intended to be within the spirit and scope of the present invention and may be selected based on a desired implementation and level of security.

The resulting token is then sent back to the caller, which in this case is the global gateway 120 via operation 313, which bypasses the need to return the token to an intermediate caller, e.g., operations 220 and 221 in FIG. 2. The global gateway 120 then forwards 314 the token to the original caller 110. Thus, a significant cost savings in terms of processing time, processing resources, and network traffic is achieved by the dynamic dispatch rules mechanisms of the illustrative embodiments, e.g., at least the processing time/resource costs and network traffic associated with operations 203-209, 230-235, and 220-221 in FIG. 2, when an existing dynamic dispatch rule is found that matches the identity specified in the call 301 and when the data has not been moved to a different data storage boundary.

FIG. 4 is an example diagram of feedback provided by a target service in response to the target service not having access to the requested data in accordance with an illustrative embodiment. As shown in FIG. 4, the example feedback response specifies the target location as "dispatch_target", which in this example is the location "eu.iam.cloud.ibm.com". The context information for the feedback response includes the "apikey", which in this case is the apikey "ABCDEFG". The other detailed information including the method, contextpath, and param_name are a description of the operation for which the dynamic rule exists. That is, each REST request is either a method GET, POST, PUT, or DELETE. Each REST request has a target contextpath, which in this depicted example is identity/token. Dependent on the target path, the functionality of the REST call differs. The example "param_name/param_value" section describes for which parameters this rule is valid.

From the content of the feedback response shown in FIG. 4, the feedback interceptor of the illustrative embodiments may extract at least the dispatch target and APIKey content for use by the dispatch rules generator 134 in automatically generating/updating a dynamic dispatch rule for storage in the dynamic dispatch rules database 138, and subsequent use in performing direct dispatching of requests to the appropriate target locations via the operations of the lookup engine 132. This feedback information, along with other contents of the feedback information, may be used to automatically and dynamically populate/update fields of a dynamic dispatch rule template to specify conditions of the dynamic dispatch rule and specific actions to be performed as a result of these conditions being satisfied.

FIG. 5 is an example diagram of a dispatch rule that is automatically and dynamically generated based on feedback received from a target service in accordance with one illustrative embodiment. As shown in FIG. 5, the content of the feedback information from the feedback response in FIG. 4 may be used to populate conditions and computer executable instructions for a dynamic dispatch rule that may be stored in the dynamic dispatch rules database 138. In the example, the method specified in the feedback response, i.e., the "GET" method, is used to populate a first condition 510, the context path specified in the feedback response is used to populate the second condition 520, and the parameter names and values for the APIKey are used to populate the third condition 530 of the dynamic dispatch rule 500. The action 540 of the dynamic dispatch rule is to dispatch the request or call to the target location specified in the feedback response of FIG. 4, which in this case is the "eu.iam.cloud.ibm.com" target location. Thus, the dynamic dispatch rule 500 indicates that if the request/call is a "GET", the request is for an context path of "/identity/token", and the APIKey is "ABCDEFG", then the corresponding action of dispatching the request to the target location "eu.iam.cloud.ibm.com" is performed.

Figure 6A:
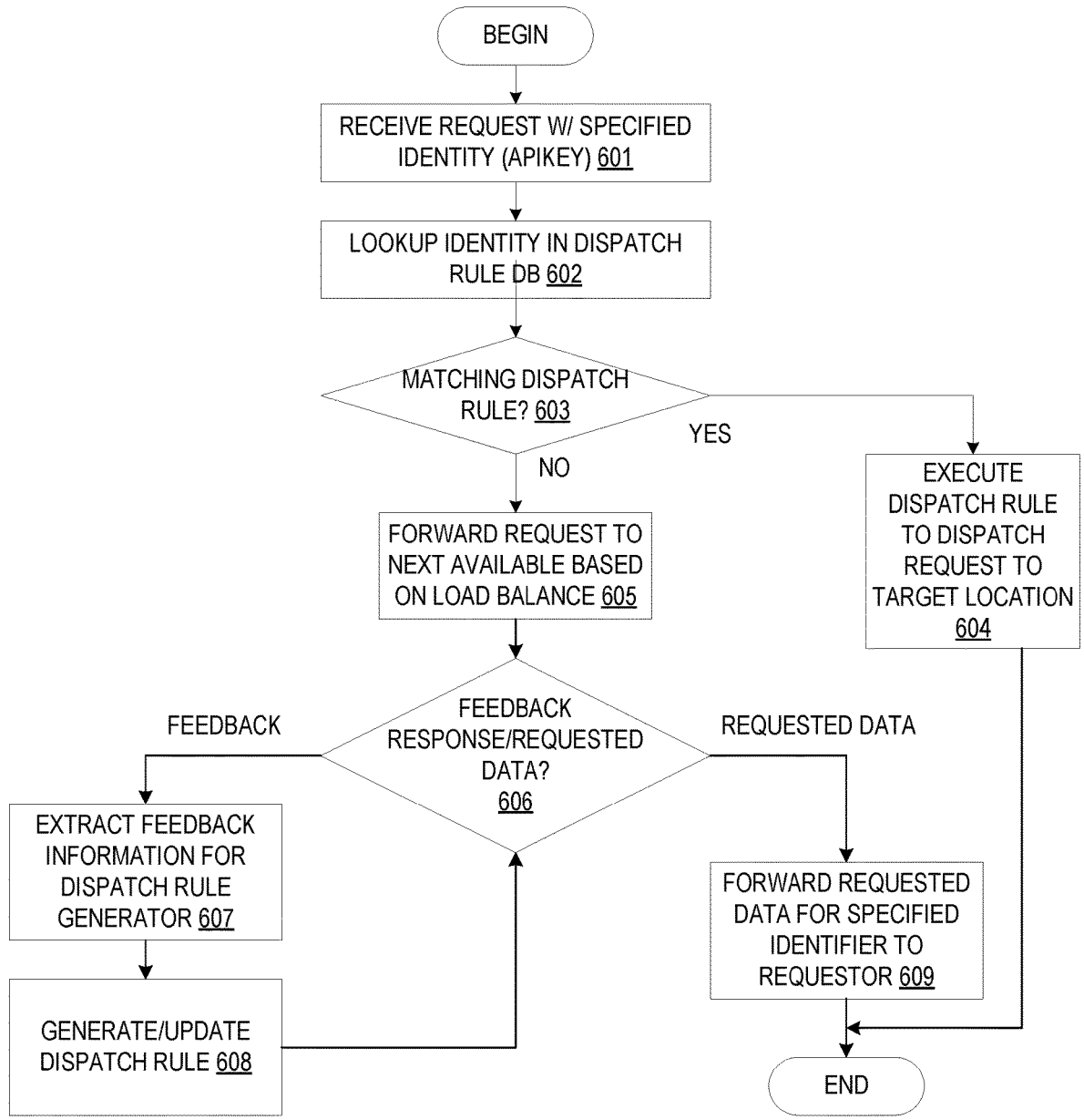
FIG. 6A is a flowchart outlining an example operation of a dispatch rule engine for a global gateway in accordance with one illustrative embodiment.
Figure 6B:
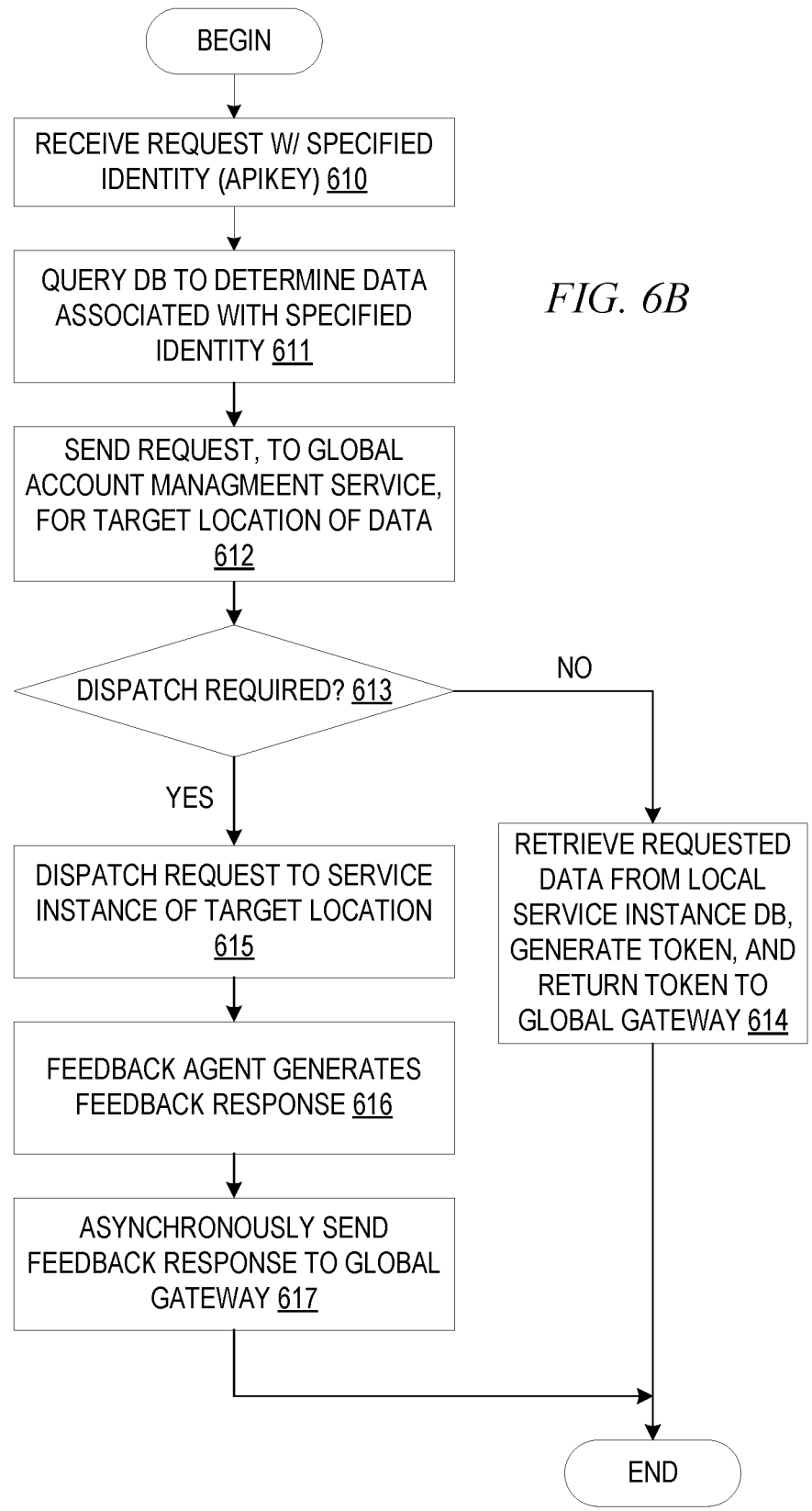
FIG. 6B is a flowchart outlining an example operation of a service instance augmented with a feedback agent in accordance with one illustrative embodiment.

FIGS. 6A-6B present flowcharts outlining example operations of elements of the present invention with regard to one or more illustrative embodiments. It should be appreciated that the operations outlined in FIGS. 6A-6B are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 6A-6B, and may, in some cases, make use of the results generated as a consequence of the operations set forth in FIGS. 6A-6B, the operations in FIGS. 6A-6B themselves are specifically performed by the improved computing tool in an automated manner.

FIG. 6A is a flowchart outlining an example operation of a dispatch rule engine, such as dispatch rule engine 130, for a global gateway in accordance with one illustrative embodiment. As shown in FIG. 6A, the operation starts with a request being received from a request source computing device, where this request specifies an identity for which access to associated requested data is to be provided (step 601). The dispatch rule engine of the global gateway performs a lookup operation to determine if an existing dynamic dispatch rule is present in the dynamic dispatch rule database that matches the identity in the request (step 602). If there is a matching existing dynamic dispatch rule (step 603; yes), the rule is executed and the global gateway dispatches the request to the target location specified in the matching dynamic dispatch rule (step 604). If there is not a matching dynamic dispatch rule (step 603; no), then the global gateway forwards the request to the next available service instances based on load balancing algorithms (step 605) and awaits a response.

A determination is made as to whether a feedback response and/or the requested data is received from the service instance to which the request is forwarded (step 606). If a feedback response is received, the feedback response is processed by a feedback interceptor which extracts feedback information that is provided to a dispatch rules generator (step 607). The dispatch rules generator 607 automatically and dynamically generates/updates a dynamic dispatch rule for the specified identity in the original request, which specifies the actual target location of the requested data (step 608). As discussed previously with regard to FIGS. 1-5, the actual target location may be determined by the service instances through a process of computations and interactions between different service instance runtimes, a global account management service, and the like, to determine where the requested data is physically located with respect to data storage boundaries, and which service instance has access to that physical location. A feedback agent of the service instance runtime may provide the feedback information to the global gateway. The global gateway continues to await the requested data, e.g., the token in FIGS. 2-3, to be returned if it has not already been received by the global gateway.

Thus, if the requested data, e.g., the token, is received, which may occur with or without a prior asynchronous feedback response having been received, then the requested data is forwarded to the original requestor, i.e., request source computing device (step 609). The operation then terminates.

FIG. 6B is a flowchart outlining an example operation of a service instance augmented with a feedback agent in accordance with one illustrative embodiment. As shown in FIG. 6B, the operation starts by the service instance receiving a request (or call) from the global gateway for access to data corresponding to a specified identity (step 610). The service instance runtime determines the data corresponding to the specified identity in the request by querying a backend service instance database (step 611) and then sends a request for the target location of the data to a global account management service (step 612). The service instance runtime receives the target location from the global account management service and determines if a dispatch of the request to another service instance is required (step 613). If not (step 613; no), the service instance performs operations to retrieve the requested data from the local service instance database, generates a corresponding token, and returns the token to the global gateway (step 614).

If the request needs to be redirected (step 613; yes), i.e., the service instance runtime does not have access to the target location, then the request is dispatched to the service instance runtime corresponding to the target location (step 615). In addition, the feedback agent generates a feedback response specifying the identity in the original request, the target location returned by the global account management service, and other context information, such as the method used and context path, for example (step 616). The feedback response is asynchronously sent to the global gateway for use in generating/updating a dynamic dispatch rule for the identity (step 617). The operation then terminates.

As is clear from the above description, the present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a dispatch rule engine for a global gateway infrastructure that comprises one or more computing devices executing applications and services for handling identity and account management (IAM) across a plurality of different data storage boundaries. The improved computing tool implements mechanism and functionality, such as automatic and dynamic dispatch rule generation and execution for dispatching requests to target locations based on data storage boundaries, which cannot be practically performed by human beings either outside of, or with the assistance of, a technical environment, such as a mental process or the like. The improved computing tool provides a practical application of the methodology at least in that the improved computing tool is able to reduce computational costs and network traffic in existing identity and account management computing systems and computing architectures by automatically and dynamically generating/updating dispatch rules that may be executed to bypass costly operations for locating the physical target storage locations of data associated with identities specified in data access requests.

Figure 7:
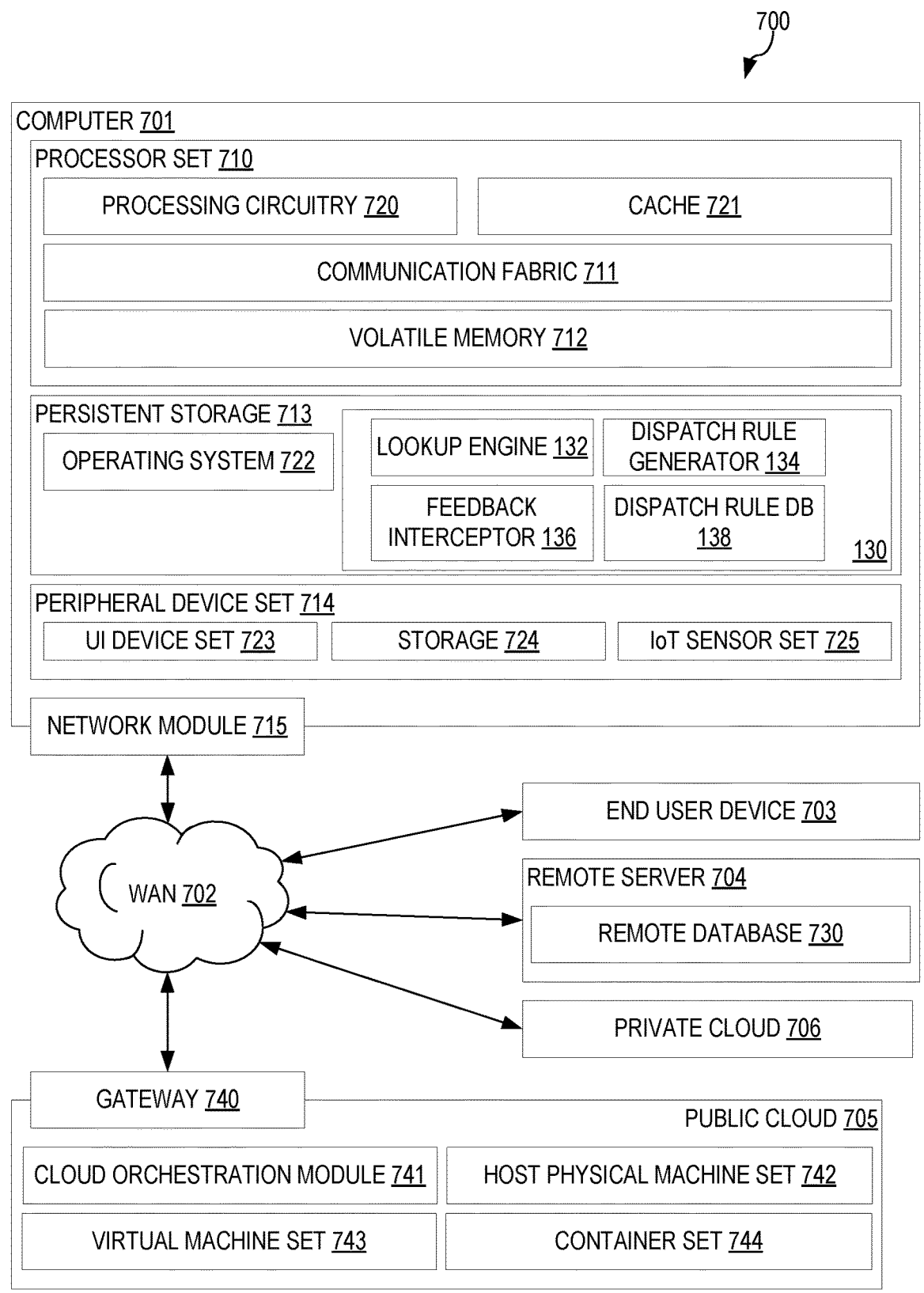
FIG. 7 is an example diagram of a distributed data processing system environment in which aspects of the illustrative embodiments may be implemented and at least some of the computer code involved in performing the inventive methods may be executed.

FIG. 7 is an example diagram of an example computing environment in which aspects of the illustrative embodiments may be provided. Computing environment 700 contains an example of an environment for the execution of at least some of the computer code involved in performing the inventive methods, such as the operations performed by the dispatch rule engine 130 of the global gateway 120 in FIG. 1. Similarly, computing devices in the computing environment 700 may be configured to provide feedback agents, such as feedback agents 143 and 153 in FIG. 1, for operation with the dispatch rule engine 130 of the global gateway 120 in accordance with one or more illustrative embodiments as described previously.

In addition to block 130, computing environment 700 includes, for example, computer 701, wide area network (WAN) 702, end user device (EUD) ZZ03, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 500, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

Computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

Processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 200 in persistent storage 713.

Communication fabric 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in block 200 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

As shown in FIG. 7, one or more of the computing devices, e.g., computer 701 or remote server 704, may be specifically configured to implement elements of a global gateway including the augmentation of the dispatch rule engine 130 of the illustrative embodiments. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 701 or remote server 704, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automatic and dynamic dispatch rule generation/updating and execution so as to perform more efficient and less computational and network traffic costly dispatching of requests to service instances taking into account the data storage boundaries established by governmental or organizational regulations and/or policies.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for dispatching requests to service instances based on data storage boundaries, the method comprising:

receiving, from a first computing device via a first communication connection with the data processing system, a first request to access data associated with an identity specified in the first request;

dispatching the first request to a first service instance associated with a first data storage boundary of a plurality of data storage boundaries, wherein each data storage boundary is defined by a regulation or policy restricting data storage of one or more specific types of data to computing devices within a specified physical, or network topological, region;

receiving a feedback response from the first service instance in response to the first service instance determining that the first service instance does not have access to the data due to the data being of a type that is associated with a second data storage boundary different from the first data storage boundary, wherein the feedback response specifies a target location associated with the second data storage boundary;

in response to receiving the feedback response, automatically generating a dynamic dispatch rule specifying the identity and the target location and storing the dynamic dispatch rule in a dynamic dispatch rule database; and processing a subsequent second request, associated with a different communication connection with the data processing system by a same or different computing device as the first computing device, specifying the identity at least by performing a lookup operation in the dynamic dispatch rule database for a matching dynamic dispatch rule corresponding to the specified identity and executing the matching dynamic dispatch rule to dispatch the subsequent request directly to a second service instance associated with the target location, wherein processing the subsequent second request comprises:

performing a lookup in the dynamic dispatch rule database for the identity specified in the second request;

in response to finding a matching dynamic dispatch rule in the dynamic dispatch rule database for the identity, executing the matching dynamic dispatch rule to set a data storage boundary, in the plurality of data storage boundaries, that corresponds to the identity, to be a second data storage boundary;

transmitting the second request to the second service instance, wherein the second service instance is associated with the second data storage boundary;
receiving data requested by the second request based on a processing of the second request at the second service instance to obtain the data requested by the second request from the target location; and
transmitting a response, based on the received data from the target location, to a requesting computing device that sent the second request.

2. The method of claim 1, wherein dispatching the first request to a first service instance comprises:
performing a lookup in the dynamic dispatch rule database for the identity specified in the first request; and
in response to failing to find a matching entry in the dynamic dispatch rule database for the identity, executing a load balancing operation to dispatch the first request to a next available service instance as the first service instance.

3. The method of claim 1, wherein receiving the feedback response from the first service instance comprises:
requesting, by the first service instance, data corresponding to the identity in the request from a backend service instance database;
in response to not finding the data corresponding to the identity in the backend service instance database, sending, by the first service instance, a target location request that requests the target location of the data to a global account management service;
receiving, by the first service instance, the target location of the data from the global account management service; and
sending, by a feedback agent of the first service instance, the feedback response specifying the target location to the data processing system.

4. The method of claim 3, wherein the feedback response is sent asynchronously, with respect to processing the first request, by the feedback agent to the data processing system, and wherein automatically generating a dynamic dispatch rule is performed asynchronously with respect to processing the first request.

5. The method of claim 1, further comprising:
dispatching, by the first service instance to the second service instance, the first request;
receiving, by the first service instance, from the second service instance, the data for which access is requested in the first request;
generating a response to the first request based on the received data; and
sending the response to a requesting computing device that sent the first request.

6. The method of claim 1, wherein the plurality of data storage boundaries are at least one of geographical, geopolitical, or organizational data storage boundaries that specify data associated with a geographical entity, geopolitical entity, or organization entity cannot be stored outside a corresponding data storage boundary.

7. The method of claim 1, wherein the identity specified in the first request is an APIKey corresponding to the data for which access is requested by the first request, and wherein the data comprises personally identifiable data of one or more accounts in a cloud computing environment, wherein the personally identifiable data of the one or more accounts is restricted to storage within corresponding data storage boundaries in the plurality of data storage boundaries.

8. The method of claim 1, wherein the data processing system is a global gateway computing system, of a cloud computing environment, operating in conjunction with a plurality of different service instances across a plurality of data storage boundaries.

9. A computer program product comprising a computer readable storage medium having a computer readable program stored therein, wherein the computer readable program, when executed on a data processing system, causes the data processing system to:
receive, from a first computing device via a first communication connections with the data processing system, a first request to access data associated with an identity specified in the first request;
dispatch the first request to a first service instance associated with a first data storage boundary of a plurality of data storage boundaries, wherein each data storage boundary is defined by a regulation or policy restricting data storage of one or more specific types of data to computing devices within a specified physical, or network topological, region;
receive a feedback response from the first service instance in response to the first service instance determining that the first service instance does not have access to the data due to the data being of a type that is associated with a second data storage boundary different from the first data storage boundary, wherein the feedback response specifies a target location associated with the second data storage boundary;
in response to receiving the feedback response, automatically generate a dynamic dispatch rule specifying the identity and the target location and storing the dynamic dispatch rule in a dynamic dispatch rule database; and
process a subsequent second request, associated with a second communication connection with the data processing system by a same or different computing device as a first computing device, specifying the identity at least by performing a lookup operation in the dynamic dispatch rule database for a matching dynamic dispatch rule corresponding to the specified identity and executing the matching dynamic dispatch rule to dispatch the subsequent request directly to a second service instance associated with the target location,
wherein processing the subsequent second request comprises:
performing a lookup in the dynamic dispatch rule database for the identity specified in the second request;
in response to finding a matching dynamic dispatch rule in the dynamic dispatch rule database for the identity, executing the matching dynamic dispatch rule to set a data storage boundary, in the plurality of data storage boundaries, that corresponds to the identity, to be a second data storage boundary;
transmitting the second request to the second service instance, wherein the second service instance is associated with the second data storage boundary;
receiving data requested by the second request based on a processing of the second request at the second service instance to obtain the data requested by the second request from the target location; and
transmitting a response, based on the received data from the target location, to a requesting computing device that sent the second request.

10. The computer program product of claim 9, wherein dispatching the first request to a first service instance comprises:

performing a lookup in the dynamic dispatch rule database for the identity specified in the first request; and in response to failing to find a matching entry in the dynamic dispatch rule database for the identity, executing a load balancing operation to dispatch the first request to a next available service instance as the first service instance.

11. The computer program product of claim 9, wherein receiving the feedback response from the first service instance comprises:

requesting, by the first service instance, data corresponding to the identity in the request from a backend service instance database;

in response to not finding the data corresponding to the identity in the backend service instance database, sending, by the first service instance, a target location request that requests the target location of the data to a global account management service;

receiving, by the first service instance, the target location of the data from the global account management service; and sending, by a feedback agent of the first service instance, the feedback response specifying the target location to the data processing system.

12. The computer program product of claim 11, wherein the feedback response is sent asynchronously, with respect to processing the first request, by the feedback agent to the data processing system, and wherein automatically generating a dynamic dispatch rule is performed asynchronously with respect to processing the first request.

13. The computer program product of claim 9, further comprising:

dispatching, by the first service instance to the second service instance, the first request;

receiving, by the first service instance, from the second service instance, the data for which access is requested in the first request;

generating a response to the first request based on the received data; and sending the response to a requesting computing device that sent the first request.

14. The computer program product of claim 9, wherein the plurality of data storage boundaries are at least one of geographical, geopolitical, or organizational data storage boundaries that specify data associated with a geographical entity, geopolitical entity, or organization entity cannot be stored outside a corresponding data storage boundary.

15. The computer program product of claim 9, wherein the identity specified in the first request is an APIKey corresponding to the data for which access is requested by the first request, and wherein the data comprises personally identifiable data of one or more accounts in a cloud computing environment, wherein the personally identifiable data of the one or more accounts is restricted to storage within corresponding data storage boundaries in the plurality of data storage boundaries.

16. The computer program product of claim 9, wherein the data processing system is a global gateway computing system, of a cloud computing environment, operating in conjunction with a plurality of different service instances across a plurality of data storage boundaries.

17. An apparatus comprising:

at least one processor; and at least one memory coupled to the at least one processor, wherein the at least one memory comprises instructions which, when executed by the at least one processor, cause the at least one processor to:

receive, from a first computing device via a first communication connection with a data processing system, a first request to access data associated with an identity specified in the first request;

dispatch the first request to a first service instance associated with a first data storage boundary of a plurality of data storage boundaries, wherein each data storage boundary is defined by a regulation or policy restricting data storage of one or more specific types of data to computing devices within a specified physical, or network topological, region;

receive a feedback response from the first service instance in response to the first service instance determining that the first service instance does not have access to the data due to the data being of a type that is associated with a second data storage boundary different from the first data storage boundary, wherein the feedback response specifies a target location associated with the second data storage boundary;

in response to receiving the feedback response, automatically generate a dynamic dispatch rule specifying the identity and the target location and storing the dynamic dispatch rule in a dynamic dispatch rule database; and process a subsequent second request, associated with a second communication connection with the data processing system by a same or different computing device as the first computing device, specifying the identity at least by performing a lookup operation in the dynamic dispatch rule database for a matching dynamic dispatch rule corresponding to the specified identity and executing the matching dynamic dispatch rule to dispatch the subsequent request directly to a second service instance associated with the target location, wherein processing the subsequent second request comprises:

performing a lookup in the dynamic dispatch rule database for the identity specified in the second request;

in response to finding a matching dynamic dispatch rule in the dynamic dispatch rule database for the identity, executing the matching dynamic dispatch rule to set a data storage boundary, in the plurality of data storage boundaries, that corresponds to the identity, to be a second data storage boundary;

transmitting the second request to the second service instance, wherein the second service instance is associated with the second data storage boundary;

receiving data requested by the second request based on a processing of the second request at the second service instance to obtain the data requested by the second request from the target location; and transmitting a response, based on the received data from the target location, to a requesting computing device that sent the second.

18. The method of claim 1, wherein processing the subsequent second request further comprises:

in response to receiving a response from the second service instance indicating that the data associated with the identity specified in the first request has moved to a third location, updating the matching dynamic dispatch rule to specify the third location as an updated target location; and redirecting the second request to the third location.

* * * * *